Figure 1:
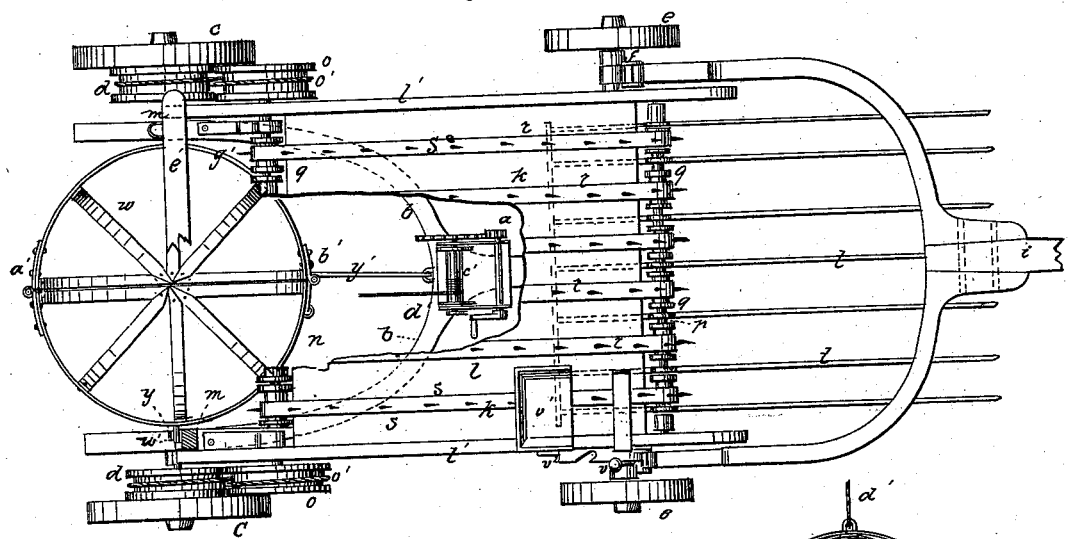

R. B. EUBANK, Jr.
Hay Raker and Stacker.

No. 209,875. Patented Nov. 12, 1878.

WITNESSES:
Chas. Nida
C. Sedgwick

INVENTOR:
R. B. Eubank Jr.
BY Munn & Co.
ATTORNEYS.

UNITED STATES PATENT OFFICE.

REUBEN B. EUBANK, JR., OF MIAMI, MISSOURI, ASSIGNOR TO GEORGE G. DUGGINS, LUTHER J. HAMNER, AND DANIEL F. BELL, OF SAME PLACE.

IMPROVEMENT IN HAY RAKER AND STACKER.

Specification forming part of Letters Patent No. 209,875, dated November 12, 1878; application filed July 5, 1878.

*To all whom it may concern:*

Be it known that I, REUBEN B. EUBANK, Jr., of Miami, in the county of Saline and State of Missouri, have invented a new and Improved Combined Hay Raking and Stacking Machine, of which the following is a specification:

The object of my invention is to improve machines which will rake up the hay after the mower, carry it to a basket or receiver until a sufficient quantity is gathered for a shock or stack, and then permit the basket to be emptied to form a stack at the desired place.

The invention will first be described in connection with the drawing, and then pointed out in the claim.

Figure 3:
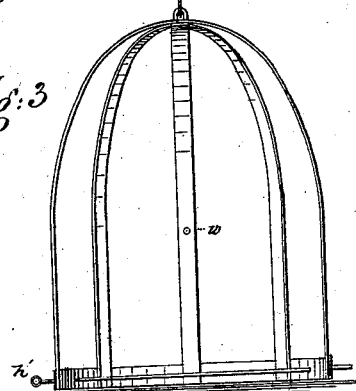
Figure 2:
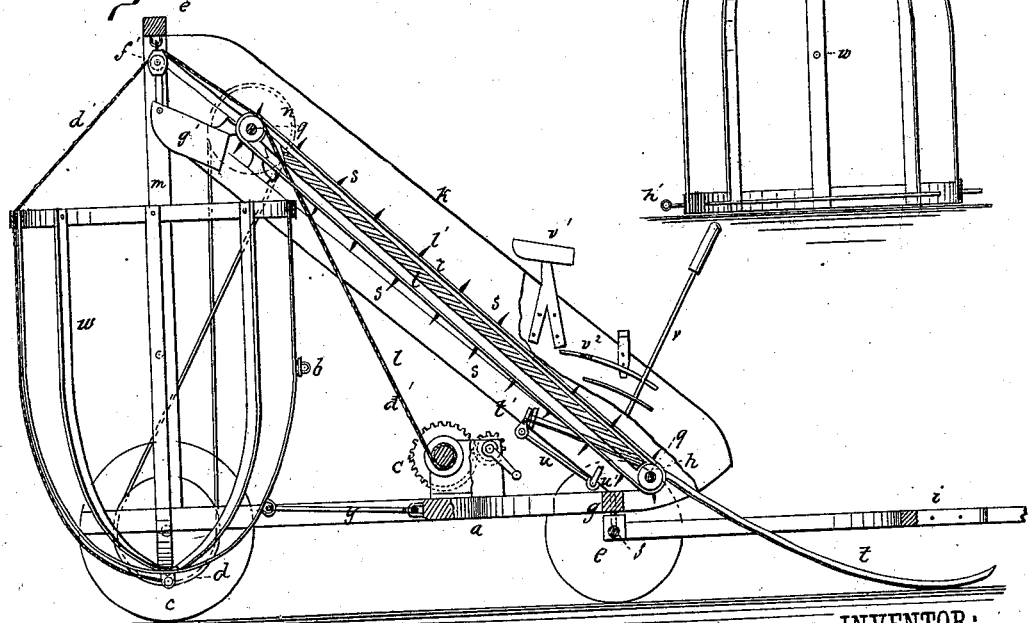
Figure 4:
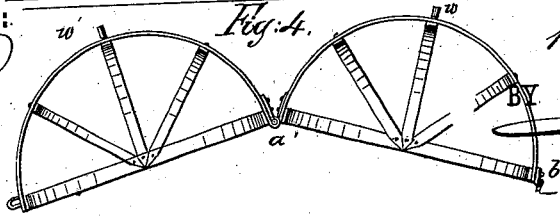

In the drawing, Figure 1 is a plan of my machine partially broken open. Fig. 2 is a vertical longitudinal section. Fig. 3 is an elevation of the basket or receiver as reversed for delivering its contents, and Fig. 4 is a plan of the basket as opened.

Similar letters of reference indicate corresponding parts.

The truck for supporting the machine consists of a center bar, $a$, having its rear portion extended in the form of two arms, $b\ b$, which carry the journals for the main wheels $c\ c$. $d\ d$ are pulleys formed with or connected to the wheels $c\ c$, and turning with them. The forward wheels, $e\ e$, are upon an axle-tree, $f$, which is connected to a cross-bar, $g$, by a king-bolt, so as to swing thereon, and $i$ is the pole or shafts connected to the axle-tree $f$. $k$ is the elevating apparatus, which may be of any desired character.

The rake or gatherer is formed of teeth $t$, hung upon the cross-shaft $p$.

The receptacle for the hay is made as an open-work metal basket, $w$. This is hung, by pins $w'$, at opposite sides of the basket, in bearings $y$ on the posts $m\ m$, so that the lower end of the receiver is between the arms $b\ b$ of the truck, and the open end is adjacent to the upper and delivery end of the elevating apparatus. $y'$ is a hook connected to the truck $a$, which may be hooked to an eye on the basket to steady it in place.

The basket $w$ is constructed in two parts, hinged together at $a'$, so that it may be opened lengthwise, as seen in Fig. 4, and the parts are held together, when closed, by a hook and staple, (shown at $b'$.) $c'$ is a windlass on the truck-frame $a$. $d'$ is a rope or chain connected upon the barrel of the windlass $a'$, and passing upward to a sheave or pulley, $f'$, on a cross-beam, $i'$, which connects the posts $m\ m$ at their upper ends. From the sheave $f'$ the rope $d'$ passes to the closed bottom end of the basket $w$, where the rope is attached. The rope $d'$ may be in two parts, adapted to being hooked together, so that it may be separated while the basket is being filled, and not interfere with the hay. $g'\ g'$ are wings or guides on the posts $m\ m$ above the basket $w$, which serve to guide the hay as it falls into the basket.

The rake $t$ gathers up the hay as the machine is drawn along, and the hay is carried up by the elevator, and falls over the top of the same into the basket $w$. When the basket is filled, or the desired quantity accumulated in it, the rods $h'$ (see Fig. 3) are inserted through holes at the top of the basket $w$ over the mass of hay, to prevent the same falling out as the basket is turned over. The windlass $c'$ is then operated to wind the rope, and the basket thereby turned in its supports $y$ until it is bottom end upward, and hangs by the rope. The bearings for the pivots $w'$ are made so that the pivots may be relieved and the basket swing clear and lowered until the open end rests upon the ground, as seen in Fig. 3. It is then to be opened, as seen in Fig. 4, the rods $h'$ first being removed, and the basket is drawn away, reversed, and put in position on the machine for refilling.

I am aware that it is not new to combine a rake and elevator with a rear-receiver, or to employ a two-part receiver that swings open and is reversible; but

What I claim as new is—

The rods $h'$, in combination with the basket $w$, substantially as described, and for the purposes set forth.

REUBEN B. EUBANK, JR.

Witnesses:
   J. M. WILLIS,
   W. H. WHEELER.